No. 11,991. Reissued May 20, 1902.
G. L. CAMPBELL.
ELECTRIC RAILWAY SYSTEM.
(Application filed Mar. 27, 1901.)
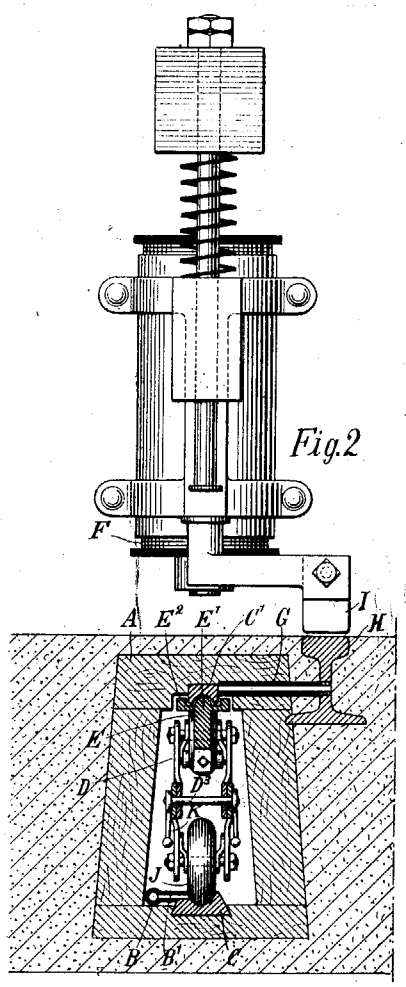
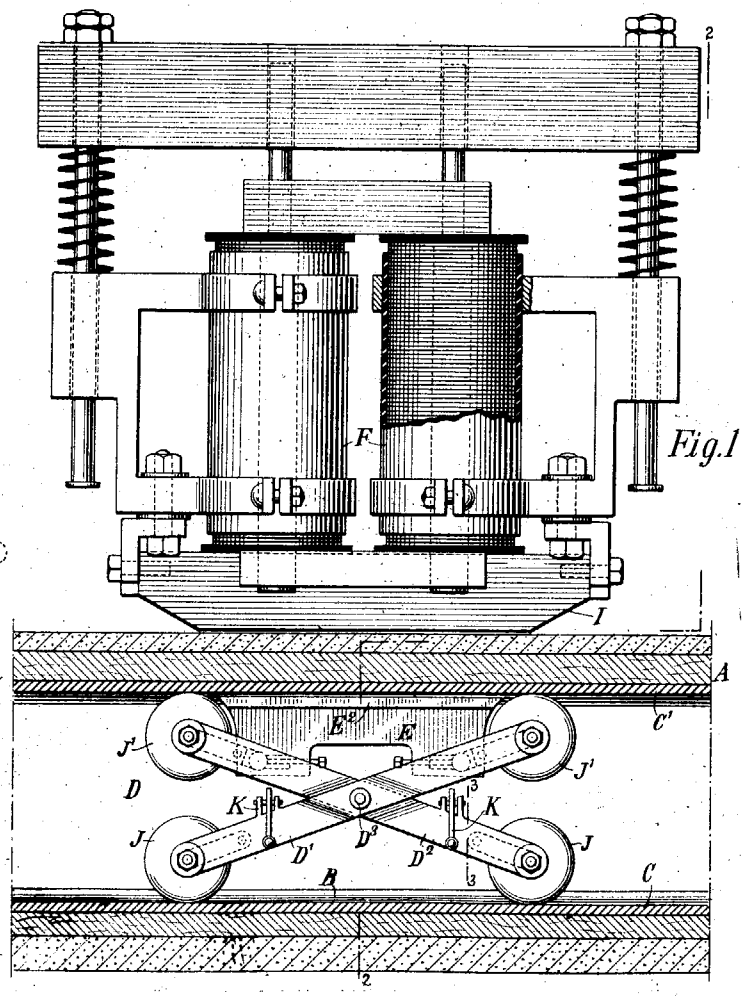
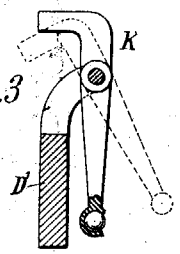
Witnesses:
Raphael Netter
James D. Cadow
Inventor
George L. Campbell,
by Frederick S. Duncan Atty

ARCO PATENTWAY 1888

UNITED STATES PATENT OFFICE.

GEORGE L. CAMPBELL, OF NYACK, NEW YORK, ASSIGNOR TO THE INTERNATIONAL ELECTRIC TRACTION COMPANY, OF NEW YORK, N. Y., A CORPORATION OF WEST VIRGINIA.

ELECTRIC-RAILWAY SYSTEM.

SPECIFICATION forming part of Reissued Letters Patent No. 11,991, dated May 20, 1902.

Original No. 656,511, dated August 21, 1900. Application for reissue filed March 27, 1901. Serial No. 53,155.

*To all whom it may concern:*

Be it known that I, GEORGE LOWE CAMPBELL, a citizen of the United States, and a resident of Nyack, in the county of Rockland and State of New York, have invented a new and Improved Electric-Railway System, of which the following is a full, clear, and exact description.

The invention relates to electric-railway systems such as shown and described in Letters Patent of the United States No. 631,321, granted to me on March 21, 1899, and in which system a closed conduit is employed having a continuous main conductor and a sectional surface conductor and in which conduit a trolley is caused to travel with the car by the influence of a magnet on the car.

The object of the invention is to provide a new and improved electric-railway system which is simple and durable in construction, perfectly reliable and safe, and arranged to insure proper conducting of the electricity from the main conductor in the conduit to the members on the car while the car is in proper running condition, and to instantly cause a dead-rail when the car leaves the track or the magnets lose their power.

The invention consists of novel features and parts and combinations of the same, as will be fully described hereinafter, and then pointed out in the claims.

A practical embodiment of my invention is represented in the accompanying drawings, forming a part of this specification, in which similar characters of reference indicate corresponding parts in all the views.

Figure 1 is a longitudinal sectional elevation through the conduit, showing the trolley-magnets on the car and the rail-shoe. Fig. 2 is a transverse section of the same on the line 2 2 in Fig. 1; and Fig. 3 is an enlarged transverse section of the trolley-support, the section being on the line 3 3 in Fig. 1.

The improved electric-railway system is provided with a conduit A, preferably made of wood, and having a top, bottom, and sides securely fastened together to form a box placed underground, as is plainly indicated in the drawings, the top of the conduit being close to the ground-surface, as shown in Fig. 2. In the conduit A is arranged an insulated feed-wire B, connected by insulated branch wires B' with the lower member C of a main conductor having its sectional top member C' arranged on the under side of the top of the conduit A, as is plainly indicated in the drawings. Only a part of one section of the sectional conductor C' is shown in Fig. 2, since the entire section is too long to be shown in correct proportion. The sections of this conductor and of the surface conductor are arranged in a manner well known in this art. The members C C' of the main conductor are electrically connected with each other when the car is in a normal running position by a trolley D, hereinafter more fully described in detail. On said trolley D is arranged an armature E, normally under the influence of magnets F, carried by the car and extending over the conduit A above the ground-surface, as is plainly shown in the drawings. The upper member C' of the conductor is connected by branch wires G with a surface conductor H in the shape of a rail arranged at any desired distance outside of the conduit A, but close to one side thereof, the top surface of the conductor being flush with the top surface of the ground, so as to be conveniently engaged by a conducting-shoe I, carried by the car and connected in the usual manner with the car-motor. Both the upper conductor C' in the conduit and the conducting-rail H are sectional, as has been stated, and each section of the conductor C' is connected with the section of the conducting-rail H immediately opposite to it, as is usual in this art.

The trolley D is provided with a frame formed of two sets of members D' D² in the shape of bars pivotally connected with each other at or near their middle by a transverse pivot D³, so that the members are swung upon said pivot D³ into an open or closed position for the purpose hereinafter more fully described. On the lower ends of the members D' D² are journaled wheels J, and similar wheels J' are journaled on the upper ends of said members, and the wheels J J' are mounted to travel in grooves formed on the top and under surfaces of the members C C′, forming the main conductors.

The armature E, previously mentioned, is slidably mounted on the upper portions of the members D′ $D^2$ of the trolley D, so that said members D′ $D^2$ are free to swing into an open or closed position, so that the height of the trolley D can vary slightly in order that the trolley may accomdate itself to the slightly-varying height of the conduit at various points along its length. The armature E is preferably formed on top with a central portion E′, fitting loosely in a groove in the upper conducting member C′, and said armature is also formed with side flanges $E^2$, extending to the sides of the said member C′ in recesses cut in the under side of the top of the conduit A, as is plainly shown in Fig. 2. By the arrangement described the armature presents a large top surface to the influence of the magnets to insure a proper opening up of the trolley-frame and perfect contact of the wheels J′ with the member C′ as long as the magnets F are active over the conduit.

On the lower portions of the members D′ $D^2$ are arranged supports K for the trolley to support said trolley in an upright position when the members D′ $D^2$ are in a closed position—that is, when the upper wheels J′ are out of engagement with the upper member C′ of the main conductor. The supports K are each in the form of a lever fulcrumed on the lower portions of the members D′ $D^2$ to swing in a transverse direction, the inner end extending in the path of the corresponding upper portion of the frame member, the outer end being adapted to engage the inner face of the side of the conduit A, so as to hold the trolley D in an upright position, as shown in the drawings.

From the foregoing it will be seen that when the members D′ $D^2$ of the frame close the upper portions of these members will come into contact with the inner ends of the supporting-levers K upon both sides of the trolley, so as to swing the lower ends of these levers outward symmetrically until they engage the sides of the conduit A. Consequently the trolley D is held in an upright position, with the wheels J′ out of engagement with the members C′ of the main conductor. As shown in the drawings, four such supports K are employed, (see Figs. 1 and 2,) and they are deemed sufficient to hold the trolley in the desired position.

The operation is as follows: When the car is running, the influence of the magnets F on the armature E will hold the latter in a raised position, so that the wheels J′ travel in the groove of the upper member C′ of the main conductor, and consequently electricity can pass from the feed-wire B, by means of the branch wire B′, to the lower member C, and thence by the wheels J, the frame members D′ $D^2$, and the wheels J′ to the upper member C′, to pass from the latter by the branch wire G to the surface conductor H and by the shoe I to the motors. The moment the car becomes derailed and the magnets F lose their power then the magnetic influence of said magnets on the armature E ceases, and consequently the members D′ $D^2$ of the trolley-frame are free to close by swinging on their pivot $D^3$, so that the wheels J′ move out of engagement with the member C′ of the main conductor, whereby electrical connection between the members C C′ of the main conductor ceases, and at the same time the closing of the trolley members causes an outward swinging of the levers or supports K, so that the trolley is supported in an upright position during the time the armature E is out of the magnetic influence of the magnets F. Furthermore, the movement of the levers or supports K in contact with the sides of the conduit causes a braking of the trolley to bring the latter to a standstill in the conduit. When the car is replaced on the track and the magnets F again exert magnetic influence on the armature E, then the latter is attracted in an upward direction, so that the members D′ and $D^2$ of the trolley-frame swing into an open position, whereby the wheels J′ again move in contact with the upper sectional member C′ of the main conductor, and consequently electrical connection is again established between the members and the sectional main conductor.

From the foregoing it is evident that a proper conducting of the electricity from the feed-wire to the members on the car is insured as long as the car is in proper running condition, and in case the car leaves the track or the magnets lose their power then the surface conductor H instantly becomes a dead-rail, and consequently there is no danger from said rail. Also, since the conductor H is sectional and since only the section or sections immediately adjacent the trolley D are electrically connected with the main conductor C through the trolley D and the sections of the conductor C′, as is usual in this art, there is no considerable extent of exposed charged conductor in the street. Indeed it is possible for the entire charged conductor to be under the car itself, so that no portion of the external conductor H would be likely to cause accidents through persons coming in contact with the same.

The device is very simple and durable in construction, is positive in operation, especially as no springs or similar devices are employed and no extra mechanism is required in any way on the car over that used in present systems, and the motormen use the present controller, &c., in the same way as heretofore and have absolutely no larger or new mechanism to take care of.

It is understood that by having the surface conductor or third rail entirely outside of the conduit, but close to one side thereof, so as to be conveniently engaged by the contact-shoe I, attached to the car, the conduit can be cheaply constructed and its bottom, sides, and top properly sealed and rendered moisture-proof to insure a proper working of the trolley at all times, and, besides, by having the surface conductor separate from the conduit and in the form of an iron or steel rail a very good contact is had at all times between the shoe and said conductor and irrespective of the relation between the magnets and the armature E. This is because the sectional conductor-rail H is sufficiently removed from the conduit, so that this rail, though made of iron, does not interfere with the proper magnetic control of the car-magnet over the armature secured to the trolley. By supporting the trolley in an upright position by the side supports in case of the car becoming wrecked the next following car-trolley will readily push the "wild" trolley along the conduit until it finally reaches the power-house and is then reused for another car.

Many modifications may be made by those familiar with this art without departing from the spirit of this invention. Furthermore, parts of this invention may be employed without using all of the same and parts may be used in connection with other devices. I do not, therefore, desire to be limited to the disclosure which I have made in this case; but

What I claim as new, and what I desire to secure by Letters Patent, is set forth in the appended claims:

1. In an electric-railway system, a conduit having a sectional main conductor, a trolley mounted to travel in said conduit in contact with said sectional conductor and carrying an armature arranged to be acted upon by the magnets on a moving car to move the trolley in said conduit, a sectional surface conductor separated from and external to said conduit and electrically connected with the sectional main conductor in the interior of the conduit, and a contact-piece on the car for contact with the said sectional surface conductor, substantially as shown and described.

2. In an electric-railway system, a conduit containing a main conductor consisting of two separated members, one of which is connected with a source of electricity and the other of which is sectional, a trolley mounted to travel on the two members of the said main conductor to electrically connect the members, a sectional surface conductor at one side of the said conduit and electrically connected with the sectional member of the main conductor and a contact-piece moving with the car and in engagement with the said sectional surface conductor, substantially as shown and described.

3. In an electric-railway system, a conduit having continuous and sectional main-conductor members, a trolley mounted to travel in said conduit in contact with said conductor members and carrying an armature arranged to be acted on by the magnets of a moving car, the said trolley being capable of opening up or folding to establish or break connection with the members of the main conductor in the conduit when the trolley is under magnetic influence or not, a sectional surface conductor separated from and external to said conduit and electrically connected with the sectional main-conductor member in the interior of the conduit and a contact-piece on the car for contact with said surface conductor, substantially as shown and described.

4. In an electric-railway system, a closed conduit, a conductor connected with a source of electricity extending along the bottom of the conduit, a sectional conductor extending along the top of the conduit, a trolley mounted to travel in the conduit to connect the conductors at the top and bottom of the same, a sectional surface conductor external to and separated from said conduit and means to electrically connect the sections of said surface conductor with the sections of said sectional conductor at the top of the conduit.

5. In an electric-railway system, a conduit carrying a main conductor, a trolley mounted to travel therein and capable of opening up or folding, to establish or break connection with the members of the main conductor in the conduit when the trolley is under magnetic influence or not, and a trolley-support for the said trolley and thrown into action when the trolley folds up, to support the trolley in an upright position in the conduit, substantially as shown and described.

6. In an electric-railway system, a trolley capable of making connection between two conductors when the trolley is under magnetic influence and arranged to break connection between the conductors when the magnetic influence ceases, and means for supporting the trolley in an upright position when connection between the conductors is broken, substantially as described.

7. In an electric-railway system, a trolley capable of making connection between two conductors when the trolley is under magnetic influence, and arranged to break connection between the conductors when the magnetic influence ceases, said trolley having members comprising bars pivotally connected with each other at or near their middle by a transverse pivot and adapted to open up or fold, substantially as set forth.

8. In an electric-railway system, a trolley capable of making connection between two conductors when the trolley is under magnetic influence, and arranged to break connection between the conductors when the magnetic influence ceases, said trolley having members pivotally connected with each other to open or fold, and a trolley-support carried by one of the members, and adapted to be actuated by the other member when the members fold, to hold the trolley in an upright position.

9. In an electric-railway system, a conduit having internal conductors, a trolley mounted to travel in said conduit, said trolley having pivoted members adapted to open up to establish connection between said conductors and to fold up or close to break the connection between said conductors, and a support for the trolley fulcrumed on the frame and moved into active position by the closing of the trolley members, substantially as shown and described.

10. In an electric-railway system, a conduit having internal conductors, a trolley mounted to travel in said conduit, said trolley having pivoted members adapted to open up to establish connection between said conductors, and to fold up or close to break the connection between said conductors, and a support carried by one of the members, and adapted to be actuated by the other member on the closing of the trolley, to bring the support in engagement with the inner surface of the conduit, to support the trolley in an upright position when folded and out of engagement with one of the conductors, substantially as shown and described.

11. In an electric-railway system, a trolley comprising a frame having pivoted members, bottom and top wheels on said members, and an armature slidably mounted on said members, substantially as shown and described.

12. In an electric-railway system, a trolley comprising a frame having two members pivotally connected with each other at or near their middle, wheels journaled on the ends of said members, and an armature carried by the upper portions of the members, substantially as shown and described.

13. In an electric-railway system, a trolley comprising a frame having two members pivotally connected with each other at or near their middle, wheels journaled on the ends of said members, and an armature carried by the upper portions of the members, the armature having a sliding connection with said portions, substantially as shown and described.

14. In an electric-railway system, a trolley comprising a frame having two members pivotally connected with each other at or near their middle, wheels journaled at the ends of the said members, and a support for the trolley and carried by said frame, and adapted to be moved into an active position when the two pivoted frame members close, substantially as shown and described.

15. In an electric-railway system, a trolley comprising a frame having two members pivotally connected with each other at or near their middle, wheels journaled at the ends of the said members, and a support for the trolley carried by said frame, and adapted to be moved into an active position when the two pivoted frame members close, said support consisting of levers pivoted to the lower portions of the frame members, and extending with one end into the path of the upper frame members, substantially as shown and described.

16. In an electric-railway system, a conduit carrying a conductor, a trolley arranged to travel in said conduit and comprising a frame having pivoted members free to swing into an open or closed position, and an armature for the magnets on the car, the said armature being carried by the upper portion of the members of the trolley-frame and having side flanges, substantially as described.

17. In an electric-railway system, a conduit containing a main conductor comprising upper and lower members, each having a longitudinal groove in its inner face, a trolley comprising a frame having pivoted members, bottom and top wheels on said members and adapted to travel in the groove in the conductor, and an armature carried by the members of the trolley-frame the said armature being formed on its top with a central portion fitting loosely in the groove of the upper member of the conductor, and also having side flanges extending to the sides of the said member of the conductor, whereby the armature presents a large top surface to the influence of the magnets on the car, substantially as described.

18. In an electric-railway system, a conduit carrying a conductor, a trolley arranged to travel in the conduit and having members pivotally connected with each other to open or close, and a trolley-support consisting of levers fulcrumed on the lower portions of the members to swing in a transverse direction, the upper or inner ends of said levers extending in the path of the corresponding upper portion of the frame members and adapted to be engaged thereby to swing the levers outward when the frame members close, the outer or free ends of said levers being adapted to engage the sides of the conduit when the levers are swung outward, substantially as described.

In testimony whereof I have signed my name to this specification in the presence of two subscribing witnesses.

GEORGE L. CAMPBELL.

Witnesses:
GEO. F. KISSAM,
H. E. KEELER.